(12) United States Patent
Suzuki et al.

(10) Patent No.: US 6,664,008 B1
(45) Date of Patent: Dec. 16, 2003

(54) SECONDARY BATTERY HAVING NONAQUEOUS ELECTROLYTE SOLUTION

(75) Inventors: Hitoshi Suzuki, Ibaraki (JP); Tomohiro Sato, Ibaraki (JP); Minoru Kotato, Ibaraki (JP); Hitoshi Ota, Ibaraki (JP); Hideharu Sato, Ibaraki (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 09/701,387

(22) PCT Filed: Jun. 1, 1999

(86) PCT No.: PCT/JP99/02918

§ 371 (c)(1),
(2), (4) Date: Jan. 30, 2001

(87) PCT Pub. No.: WO99/63612

PCT Pub. Date: Dec. 9, 1999

(30) Foreign Application Priority Data

Jun. 4, 1998 (JP) .............................. 10-155817
Mar. 31, 1999 (JP) .............................. 11-91200

(51) Int. Cl.$^7$ .............................. H01M 10/08
(52) U.S. Cl. .............. 429/337; 429/324; 429/326; 429/327
(58) Field of Search ................ 429/337, 324, 429/326, 327

(56) References Cited

U.S. PATENT DOCUMENTS 5,262,255 A * 11/1993 Ito .............................. 429/217
5,681,669 A * 10/1997 Yoshio ...................... 429/194
5,753,389 A *  5/1998 Gan .......................... 429/197

FOREIGN PATENT DOCUMENTS

EP 778630 * 12/1995 ............ H01M/4/58
EP 1 005 098 A2 * 5/2000 ............ H01M/6/16

(List continued on next page.)

*Primary Examiner*—Mark Ruthkosky
(74) *Attorney, Agent, or Firm*—Oblon, Spivak, McClelland, Maier & Neustadt, P.C.

(57) ABSTRACT

Disclosed is a non-aqueous electrolytic solution secondary cell having a negative electrode containing a carbonaceous material capable of occluding and liberating lithium, a positive electrode, a non-aqueous electrolytic solution which includes a solute and an organic solvent, and a separator; wherein the organic solvent contains at least one of compounds selected from those expressed by the formulae (I) and (II) below (in which φ represents a phenyl group optionally having an alkyl group; and R represents any one of a hydrogen atom, $C_{1-4}$ alkyl groups and a phenyl group optionally having an alkyl group). Such non-aqueous electrolytic solution secondary cell of the present invention is successful in suppressing decomposition of the electrolytic solution, and achieving a high capacity and excellent cycle characteristics.

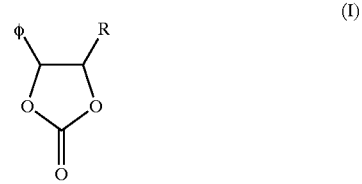

(I)

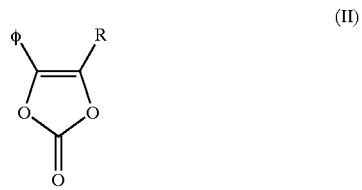

(II)

16 Claims, 2 Drawing Sheets

FOREIGN PATENT DOCUMENTS

| | | | | |
|---|---|---|---|---|
| EP | 1 220 348 A2 * | 7/2002 | .......... | H01M/10/40 |
| JP | 2-82466 | 3/1990 | | |
| JP | 4-255670 | 9/1992 | | |
| JP | 6-267531 | 9/1994 | | |
| JP | 7-235294 | 9/1995 | | |
| JP | 8-106909 | 4/1996 | | |
| JP | 8-273700 | 10/1996 | | |
| JP | 8-293323 | 11/1996 | | |
| JP | 9-22722 | 1/1997 | | |
| JP | 9-161777 | 6/1997 | | |
| JP | 9-213328 | 8/1997 | | |
| JP | 11-339849 * | 12/1999 | .......... | H01M/10/40 |

* cited by examiner

SECONDARY BATTERY HAVING NONAQUEOUS ELECTROLYTE SOLUTION

FIELD OF THE INVENTION

This invention relates to a non-aqueous electrolytic solution secondary cell, and in more detail to such cell using an electrolytic solution containing a specific aromatic carbonate. The cell of the present invention is successful in suppressing decomposition of the electrolytic solution, and achieving a high capacity and excellent cycle characteristics, and thus can allow down sizing and improvement in performances of the non-aqueous electrolytic solution secondary cell.

RELATED ART

Along with recent trends in weight and size reductions of electric appliances, attention to lithium secondary cell has been growing due to its high energy density. There are also requirements for improved cell characteristics as applications of lithium secondary cell spread.

A secondary lithium cell having a metal lithium negative electrode has a long history of extensive studies expected for providing a high energy density. The cell, however, suffers from a technical problem in that metal lithium is likely to grow up to form dendrite on the surface of the negative electrode after repetitive charge/discharge cycles, and the dendrite can finally reach the positive electrode to thereby cause short-circuit failure, which is a largest obstacle to the practical use thereof.

There is proposed a non-aqueous electrolytic solution secondary cell employing as a negative electrode material a carbonaceous material, such as coke, artificial graphite or natural graphite, which is capable of occluding or liberating lithium ion. Such non-aqueous secondary cell is successful in that the growth of the dendrite is fully controlled and thereby the lifetime and safety of the cell improves, since lithium does not present in a form of solid metal state.

The negative electrode made of a carbonaceous material is generally obtained by dispersing carbon powder material and optional conductive material (e.g., carbon black, acetylene black) into a binder to thereby prepare a slurry, coating the obtained slurry onto a current collector, and drying the coated film. The binder employed herein may be a variety of known substances such as polyvinylidene fluoride and poly (tetrafluoroethylene), where polyvinylidene fluoride is most popular due to its excellent chemical stability and convenience in electrode production.

On the other hand, as for a solvent for the electrolytic solution of such lithium secondary cell, non-aqueous organic solvents generally used include carbonates such as ethylene carbonate, propylene carbonate and diethyl carbonate; and esters such as γ-butyrolactone. A problem of decomposition of the electrolytic solution is, however, inevitable in the lithium secondary cell despite a relatively high stability of the foregoing solvents contained in such electrolytic solution, since the cell has an operational potential range of as large as 3 V or above and uses a highly active lithium. This tends to result in degraded charge-discharge efficiency and cycle characteristics.

It is therefore an object of the present invention to provide a non-aqueous electrolytic solution secondary cell minimizing the decomposition of the electrolytic solution and thus achieving excellent cycle characteristics and energy density, and in particular achieving a high maintenance factor of the discharge capacity.

SUMMARY OF THE INVENTION

The inventors of the present invention found out, after extensive investigations to accomplish the foregoing object, that using an electrolytic solution containing a specific kind of aromatic carbonate can successfully provide a non-aqueous electrolytic solution secondary cell with excellent characteristics and high energy density, which led us to propose the present invention.

That is, the present invention is to provide a non-aqueous electrolytic solution secondary cell comprising a negative electrode containing a carbonaceous material capable of occluding and liberating lithium, a positive electrode, a non-aqueous electrolytic solution which includes a solute and an organic solvent, and a separator;

wherein the organic solvent contains at least one of compounds selected from those expressed by the formulae (I) and (II) below:

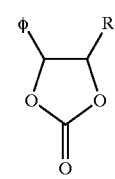

(I)

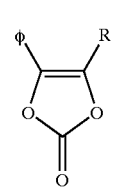

(II)

(in which φ represents a phenyl group optionally having an alkyl group; and R represents any one of a hydrogen atom, $C_{1-4}$ alkyl groups and a phenyl group optionally having an alkyl group).

BRIEF DESCRIPTION OF THE DRAWINGS

The above and other objects and features of the invention are apparent to those skilled in the art from the following preferred embodiments thereof when considered in conjunction with the accompanied drawings, in which.

DETAILED DESCRIPTION OF THE INVENTION

Figure 1:
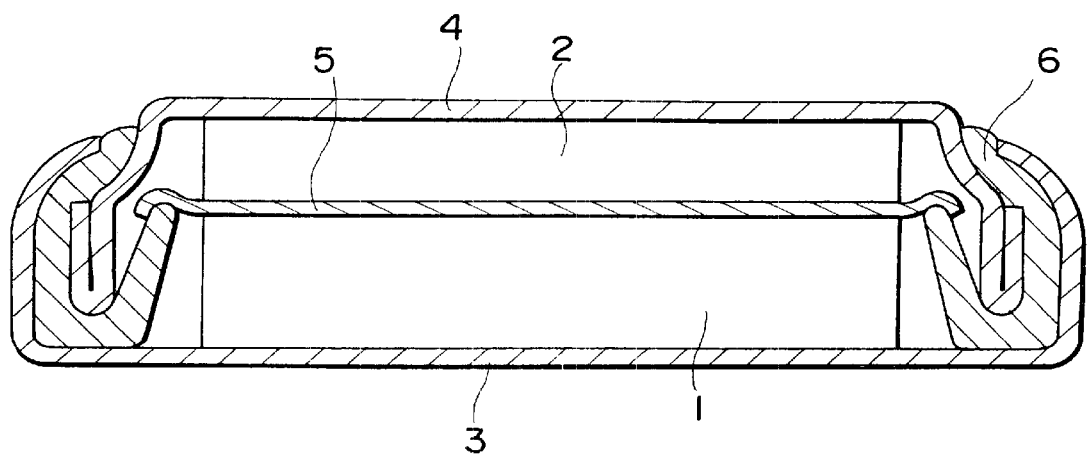
FIG. 1 is a sectional view showing a coin-shaped cell according to Examples 1 to 6 of the present invention and Comparative Examples 1 and 2; in which numeral 1 denotes a positive electrode, 2 denotes a negative electrode, 3 denotes a can, 4 denotes a seal plate, 5 denotes a separator and 6 denotes a gasket.

The non-aqueous electrolytic solution secondary cell of the present invention is characterized in that containing as the non-aqueous organic solvent thereof at least one compounds selected from those expressed by the formulae (I) and (II).

In formulae (I) and (II), φ represents a phenyl group optionally having an alkyl group. While there is no special limitation on the number and position of the substitution, it is preferable to choose a $C_{1-8}$ alkyl group, and specific examples thereof include methyl group, ethyl group, propyl group, butyl group and hexyl group, among which methyl group and ethyl group being especially preferable. For the case the compound has two or more alkyl groups, such alkyl groups may be the same or may differ from each other. Specific examples of the phenyl groups optionally having an alkyl group include phenyl group, methylphenyl group, ethylphenyl group, propylphenyl group, butylphenyl group, hexylphenyl group and dimethylphenyl group.

R represents any one of a hydrogen atom, $C_{1-4}$ alkyl groups and a phenyl group optionally having an alkyl group. The $C_{1-4}$ alkyl groups are exemplified as methyl group, ethyl group, n-propyl group, isopropyl group, n-butyl group, isobutyl group, sec-butyl group and tert-butyl group. Also the phenyl group optionally having an alkyl group can be defined similarly, but independently, to φ.

As for the cyclic carbonate having such a phenyl group expressed by the formula (I) or (II), examples of the compounds expressed by the formula (I) include phenylethylene carbonate, diphenylethylene carbonate, methylphenylethylene carbonate (R=methyl group, φ=phenyl group) and ethylphenylethylene carbonate (R=ethyl group, φ=phenyl group); and examples of the compounds expressed by the formula (II) include phenylvinylene carbonate, diphenylvinylene carbonate, methylphenylvinylene carbonate (R=methyl group, φ=phenyl group), and ethylphenylvinylene carbonate (R=ethyl group, φ=phenyl group). These compounds may be used in combination of two or more thereof.

Now the compounds expressed by the formulae (I) and (II) can be synthesized according to the procedures described in Clark, J. R., *J. Org. Chem.*, 24, 1088 (1959); Morris, L. R., *J. Org. Chem.*, 27, 1451 (1962); and Breitbeil, F. W. et al., *Transactions, Ill. State Acad. Sci.*, 67, 139(1974).

Possible organic solvent components other than the cyclic carbonate having a phenyl group as expressed by the formulae (I) and (II) include cyclic carbonates such as ethylene carbonate, propylene carbonate and butylene carbonate; chain carbonates (or linear carbonates) such as dimethyl carbonate, diethyl carbonate and ethylmethyl carbonate; cyclic esters such as γ-butyrolactone and γ-valerolactone; chain esters such as methyl acetate and methyl propionate; cyclic ethers such as tetrahydrofuran, 2-methyltetrahydrofurun and tetrahydropyrane; chain ethers such as dimethoxyethane and dimethoxymethane; and sulfur-containing organic solvents such as sulfolane and diethylsulfone. Among these, cyclic carbonates and chain carbonates are particularly preferable. These solvents may be used in any combination of two or more species.

The compounds expressed by the formulae (I) and (II) are generally used in a total content of 0.05 to 40 wt % of the organic solvent, more preferably 0.1 to 20 wt %, and still more preferably 0.2 to 10 wt %. The total content less than 0.05 wt % may undesirably result in poor film formation, whereas exceeding 40 wt % may undesirably result in an increased viscosity of the electrolytic solution, which lowers the electric conductivity thereof and thus degrade the performance of the cell.

The solute most generally used is a lithium salt. While there is no specific limitation on the lithium salt, possible examples thereof include inorganic salts such as $LiClO_4$, $LiPF_6$, $LiBF_4$, $LiAsF_6$, $LiSbF_6$, LiI, LiBr, LiCl, $LiAlCl$, $LiHF_2$, LiSCN, $LiBPh_4$; and organic salts, more specifically fluorine-containing organic lithium salts, such as $LiCF_3SO_3$, $LiN(CF_3SO_2)_2$, $LiN(CF_3CF_2SO_2)_2$, $LiN(CF_3SO_2)$ $(C_4F_9SO_2)$ and $LiC(CF_3SO_2)_3$. Among these, particularly preferable are $LiClO_4$, $LiPF_6$, $LiBF_4$, $LiCF_3SO_3$, $LiN(CF_3SO_2)_2$, $LiN(CF_3CF_2SO_2)_2$, $LiN(CF_3SO_2)$ $(C_4F_9SO_2)$ and $LiC(CF_3SO_2)_3$; and more preferable are $LiPF_6$, $LiBF_4$, $LiN(CF_3SO_2)_2$ and $LiN(CF_3CF_2SO_2)_2$; and still more preferable are $LiPF_6$ and $LiBF_4$. These solutes may be used in any combination of two or more thereof.

A concentration of the solute in the electrolytic solution is generally 0.5 to 2 mol/L, and more preferably 0.5 to 1.5 mol/L. The concentration less than 0.5 mol/L or exceeding 2 mol/L may undesirably lower the electric conductivity of the electrolytic solution.

A material for composing the negative electrode of the non-aqueous electrolytic solution secondary cell of the present invention is not particularly limited so far as it can occlude and release lithium, and specific examples thereof include thermal decomposition products of organic substances obtained under various conditions, artificial graphite and natural graphite. More preferable examples widely used include artificial graphite obtained by high-temperature annealing of soft (graphitizable) pitch of various origins; purified natural graphite; and materials obtained by various surface treatments of these graphites. Such graphitic material preferably has a "d" value (interlayer distance) for lattice plane (002) determined by X-ray diffraction analysis based on the Gakushin-Ho method (a method for determining crystallite size and lattice constant of carbon authorized by Japan Society for the Promotion of Science) of 0.335 to 0.340 nm, and more preferably 0.335 to 0.337 nm. Such graphitic material preferably has an ash content of 1 wt % or less, more preferably 0.5 wt % or less, and most preferably 0.1 wt %, and also has a crystallite size "$L_C$" determined by X-ray diffraction analysis based on the Gakushin-Ho method of 30 nm or larger, more preferably 50 nm or larger, and most preferably 100 nm or larger. Such graphitic material preferably has a median diameter determined by the laser diffraction-scattering method of 1 to 100 µm, more preferably 3 to 50 µm, still more preferably 5 to 40 µm, and most preferably 7 to 30 µm. Such graphitic material preferably has a specific surface area determined by the BET method of 0.5 to 25.0 m²/g, more preferably 0.7 to 20.0 m²/g, still more preferably 1.0 to 15.0 m²/g, and most preferably 1.5 to 10.0 m²/g. Such graphitic material preferably has an intensity ratio "R" (=$I_B/I_A$) of 0 to 0.5, wherein "$I_A$" being an intensity of peak "$P_A$" within a wavelength range from 1580 to 1620 cm$^{-1}$ observed in argon ion laser Raman spectrometry and "$I_B$" being an intensity of peak "$P_B$" within a wavelength range from 1350 to 1370 cm$^{-1}$. A half width of the peak within a wavelength range from 1580 to 1620 cm$^{-1}$ is preferably 26 cm$^{-1}$ or less, and more preferably 25 cm$^{-1}$ or less.

These carbonaceous materials may be used as mixed with a negative electrode material capable of occluding and liberating lithium. Such negative electrode material other than the carbonaceous materials and capable of occluding and liberating lithium is exemplified as metal oxides such as stannic oxide and silicon oxide; lithium metal or various lithium alloys. Such negative electrode materials may be used in any combination of two or more species thereof.

There is no special limitation on methods of producing the negative electrode using such negative electrode materials. For example, the negative electrode material may optionally be added with a binder, thickener, conductive material, solvent or the like to thereby prepare a slurry, and the obtained slurry is coated on a substrate of a current collector, which is followed by drying to produce an electrode material. Such electrode material may be subjected to roll forming or compression molding to be fabricated into a sheet or pellet, respectively.

Another specific feature of the present invention relates to that the negative electrode employs as a binder at least one rubber selected from the group consisting of styrene-butadiene rubber (abbreviated as SBR on occasions hereinafter), hydrogenated styrene-butadiene rubber, styrene-isoprene rubber, hydrogenated styrene-isoprene rubber, isoprene rubber, butadiene rubber and ethylene-propylene rubber. Among these, SBR and styrene-isoprene rubber are particularly preferable, and SBR is most preferable. SBR available in the present invention refers to a copolymer prepared by emulsion polymerization of butadiene and styrene, where types of which being not specifically limited. Such SBR is also commercially available from Japan Synthetic Rubber Co., Ltd., Zeon Corporation, Sumitomo Chemical or Mitsubishi Chemical Corporation. Examples of the thickener include carboxymethyl cellulose, methyl cellulose, hydroxymethyl cellulose, ethyl cellulose, polyvinyl alcohol, starch oxide, starch phosphate and casein.

The conductive material can be exemplified as metal materials such as copper and nickel; or carbonaceous materials such as graphite and carbon black.

The material for the current collector of the negative electrode is preferably metal such as copper, nickel or stainless steel, among which copper in a form of foil being more preferable due to its processability into a thin film and its inexpensiveness.

The positive electrode material for use in the cell of the present invention can be selected from those capable of occluding and liberating lithium, which are exemplified as composite oxide materials of lithium and transition metal such as lithium cobalt oxide, lithium nickel oxide and lithium manganese oxide.

There is no special limitation on methods of producing the positive electrode, and the electrode can be produced essentially according to the foregoing method of producing the negative electrode. That is, the positive electrode material optionally added with a binder, conductive material or the like may be coated on a substrate of a current collector to thereby produce a sheet-type electrode, or may be press-formed to thereby produce a pellet electrode.

The current collector for the positive electrode is preferably made of valve metal or its alloy, where the valve metal means a metal capable of forming a passivation film by anodization in an electrolytic solution. The valve metal includes metals of Groups IIIa, IVa and Va of the Periodic Table and alloys containing these metals. Specific examples thereof include aluminum, titanium, tantalum, and alloys thereof. Among these, aluminum and aluminum alloys are particularly preferable for their high energy density which is ascribable to their light weight.

While species and shapes of the separator for use in the cell of the present invention are not specifically limited, it is now preferable to select the material which is excellent in stability to the electrolytic solution and in retention of the solution. Polyolefin-base porous sheet and non-woven fabric, made of polyethylene, polypropylene or the like, are of preferable selection.

Methods for producing the cell of the present invention using such negative electrode, positive electrode and non-aqueous electrolytic solution, are not specifically limited, and can properly be selected from those being generally employed.

Shape of the cell is not restricted, where available shapes may be of cylinder type, in which sheet electrodes and the separator are wound up in spiral; cylinder type with an inside-out structure, in which pellet electrodes and the separator are combined; and coin type, in which pellet electrodes and the separator are stacked.

The non-aqueous secondary cell of the present invention is characterized in that achieving a minimum decomposition level of the electrolytic solution, and thus affording excellent cycle characteristics. While not sticking to any specific theory, such suppression of the decomposition of the electrolytic solution may be ascribable to formation of a significantly stable and lithium ion-permeable protective film on the surface of the electrode kept in contact with the electrolytic solution, since the electrolytic solution uses the organic solvent containing the cyclic carbonate compound having a phenyl group. It is thus supposed that such suppression of the decomposition of the electrolytic solution allows production of the secondary cell with excellent cycle characteristics and high energy density.

Using styrene-butadiene rubber for the binder of the negative electrode allows to provide the non-aqueous secondary cell with more improved cycle characteristics. While not sticking to any specific theory, it is supposed that using the styrene-butadiene rubber allows formation of a significantly stable and lithium ion-permeable protective film on the surface of the electrode kept in contact with the electrolytic solution, and that such protective film can control the decomposition of the electrolytic solution and reaction between the binder and lithium. This can promote further down-sizing and performance upgrading of the non-aqueous electrolytic solution secondary cell.

EXAMPLES

The present invention will be explained in more detail with reference to the following Examples and Comparative Examples. Materials, amounts of uses, ratios, operations and so forth described hereinafter are properly be modified without departing from the spirit of the present invention. The scope of the present invention, therefore, is not limited to specific examples described below.

Example 1

Eighty-five weight parts of $LiCoO_2$ as a positive electrode material was added with 6 weight parts of carbon black and 9 weight parts of polyvinylidene fluoride (KF-1000, product of Kureha Chemical Industry Co., Ltd.), and was then dispersed into N-methyl-2-pyrrolidone to obtain a slurry. The obtained slurry was uniformly coated on an aluminum foil of 20 $\mu$m thick, which is a current collector for the positive electrode, dried, and the foil was punched into a predetermined shape (disc of 12.5 mm diameter) to thereby produce a positive electrode.

On the other hand, 94 weight parts of artificial graphite powder (KS-44, product of Timcal Japan Inc.) as a negative electrode material was mixed with 6 weight parts of polyvinylidene fluoride, and then dispersed into N-methyl-2-pyrrolidone to obtain a slurry. The obtained slurry was uniformly coated on a copper foil of 18 $\mu$m thick, which is a current collector for the negative electrode, dried, and the foil was punched into a predetermined shape (disc of 12.5 mm diameter) to produce a negative electrode.

The electrolytic solution was prepared by dissolving, under a dry argon atmosphere, phenylethylene carbonate having a phenyl group and a hydrogen atom for $\phi$ and R in the formula (I), respectively, into a 50:50 mixture of ethylene carbonate and diethyl carbonate at a ratio of 10 wt %, and by dissolving thereto a thoroughly dried lithium hexafluorophosphate ($LiPF_6$) as a solute at a ratio of 1 mol/L.

Using such positive electrode, negative electrode and electrolytic solution, a coin-shaped non-aqueous electrolytic solution cell as shown in FIG. 1 was fabricated under the dry argon atmosphere. More specifically, a positive electrode 1 and negative electrode 2 were respectively housed in a positive electrode can 3 and sealing plate 4, both of which made of stainless steel, and the both were then stacked as interposed with a separator 5 immersed with the electrolytic solution. Thereafter the positive electrode can 3 and sealing plate 4 was crimped together with a gasket 6 to fabricate a coin-shaped cell.

Example 2

A coin-shaped cell was fabricated similarly to Example 1 except that using diphenylvinylene carbonate having a phenyl group for both of φ and R in the formula (II), respectively, in place of phenylethylene carbonate.

Comparative Example 1

A coin-shaped cell was fabricated similarly to Example 1, except that using an electrolytic solution obtained by dissolving a thoroughly dried $LiPF_6$ into the a 50:50 mixture of ethylene carbonate and diethyl carbonate at a ratio of 1 mol/L.

Example 3

A coin-shaped cell was fabricated similarly to Example 1, except that using an electrolytic solution obtained by dissolving phenylethylene carbonate into propylene carbonate at a ratio of 10 wt %, and by dissolving thereto a thoroughly dried $LiPF_6$ at a ratio of 1 mol/L.

Example 4

A coin-shaped cell was fabricated similarly to Example 3, except that using diphenylvinylene carbonate in place of phenylethylene carbonate.

Comparative Example 2

A coin-shaped cell was fabricated similarly to Example 1, except that using an electrolytic solution obtained by dissolving $LiPF_6$ into propylene carbonate at a ratio of 1 mol/L.

The cells obtained from Examples 1 to 4 and Comparative Examples 1 and 2 were individually subjected to a charge/discharge test at 25° C. with a constant current of 0.5 mA, a charge termination voltage of 4.2 V and a discharge termination voltage of 2.5 V.

Discharge capacities and maintenance factors of the discharge capacity of the individual cells at the 10th and 100th cycles were shown in Table 1. The maintenance factor of the discharge capacity can be estimated from the equation below, which provides an index of the cycle characteristics:

$$\text{Maintenance factor of discharge capacity (\%)} = \frac{\text{Discharge capacity at the 100th cycle}}{\text{Discharge capacity at the 10th cycle}} \times 100$$

TABLE 1

| | Discharge Capacity (mAh/g) | | Maintenance factor of |
| --- | --- | --- | --- |
| | 10th cycle | 100th cycle | discharge capacity (%) |
| Example 1 | 270.0 | 249.2 | 92.3 |
| Example 2 | 262.4 | 235.4 | 89.7 |
| Comparative Example 1 | 254.6 | 223.6 | 87.8 |
| Example 3 | 261.7 | 230.4 | 88.0 |
| Example 4 | 249.2 | 202.3 | 81.2 |
| Comparative Example 2 | — | — | |

It is clear from Table 1 that the samples using the electrolytic solution containing the cyclic carbonate which has a phenyl group showed higher maintenance factors of the discharge capacity and improved cycle characteristics (when compared Examples 1 to 4 with Comparative Examples 1 and 2). The electrolytic solution using propylene carbonate as an only solvent (Comparative Example 2) failed in providing an operable cell due to serious decomposition of propylene carbonate on the surface of the carbonaceous negative electrode, whereas adding the cyclic carbonate having a phenyl group to propylene carbonate (Examples 3 and 4) recovered the operation of the cell and significantly improved the discharge capacities and cycle characteristics.

Example 5

Eighty-five weight parts of $LiCoO_2$ as a positive electrode material was added with 6 weight parts of carbon black, and further mixed with an N-methyl-2-pyrrolidone solution of polyvinylidene fluoride (KF-1000, product of Kureha Chemical Industry Co., Ltd.) so as to attain a solid content of 9 weight parts to thereby obtain a slurry. The obtained slurry was uniformly coated on an aluminum foil of 20 μm thick, which is a current collector for the positive electrode, dried, and the foil was punched into a predetermined shape (disc of 12.5 mm diameter) to thereby produce a positive electrode.

On the other hand, 94 weight parts of artificial graphite powder (KS-44, product of Timcal Japan Inc.) as a negative electrode material was mixed with a distilled water-base dispersion of styrene-butadiene rubber (SBR) so as to attain a solid content of 6 weight parts, mixed using a disperser to thereby obtain a slurry. The obtained slurry was uniformly coated on a copper foil of 18 μm thick, which is a current collector for the negative electrode, dried, and the foil was punched into a predetermined shape (disc of 12.5 mm diameter) to produce a negative electrode.

The electrolytic solution was prepared by dissolving, under a dry argon atmosphere, phenylethylene carbonate having a phenyl group and a hydrogen atom for φ and R in the formula (I), respectively, into a 50:50 mixture of ethylene carbonate and diethyl carbonate at a ratio of 10 wt %, and by dissolving thereto a thoroughly dried lithium hexafluorophosphate ($LiPF_6$) as a solute at a ratio of 1 mol/L.

Using such positive electrode, negative electrode and electrolytic solution, a coin-shaped non-aqueous electrolytic solution cell as shown in FIG. 1 was fabricated under the dry argon atmosphere. More specifically, a positive electrode 1 was housed in a can 3 made of stainless steel, which serves also as a positive current conductor, and further thereon a separator 5 immersed with the electrolytic solution and a negative electrode 2 were stacked in this order. The can 3 is finally crimped with a sealing plate 4, which also serves as a negative current conductor, together with an insulating gasket 6, to thereby fabricate a coin-shaped cell.

Example 6

A coin-shaped cell was fabricated similarly to Example 5 except that using polyvinylidene fluoride as a binder for the negative electrode and dispersing it into N-methyl-2-pyrolidone to prepare the slurry.

Figure 2:
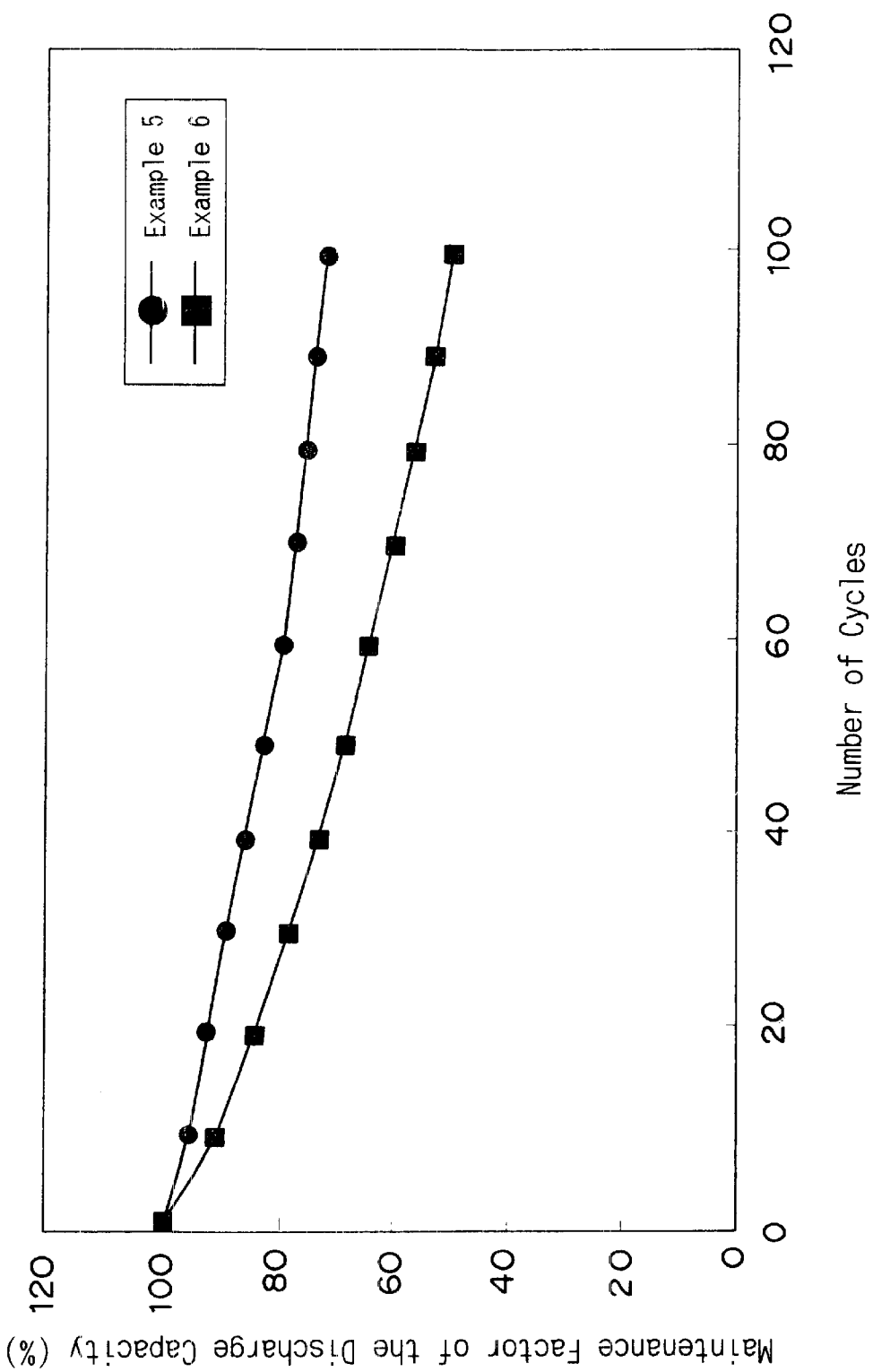
FIG. 2 is a diagram showing relations between the number of charge/discharge cycles and maintenance factor of the discharge capacity at 60° C. in Examples 5 and 6 of the present invention.

The cells obtained from Examples 5 and 6 were charged with a constant current of 1.6 mA, and were then individually subjected to a three-cycle charge/discharge test at 25° C. with a termination voltage of 4.2 V and a discharge termination voltage of 2.5 V, and were further subjected to a charge/discharge test at 60° C. FIG. 2 shows graphs for the individual cells, which represent relations between the maintenance factor of the discharge capacity and the number of charge/discharge cycles.

It is clear from FIG. 2 that the samples using the electrolytic solution containing the cyclic carbonate which has a phenyl group showed high maintenance factors of the discharge capacity. It was found that, in particular for the sample using styrene-butadiene rubber as a binder for the negative electrode (Example 5), the maintenance factor of the discharge capacity improved even after the cycle test at a relative high temperature of 60° C., which ensured excellent cycle characteristics.

Example 7

Under an argon atmosphere, phenylethylene carbonate was dissolved into propylene carbonate in an amount of 10 wt %, and the obtained solution was further added with a thoroughly dried $LiPF_6$ as a solute at a concentration of 1 mol/L.

Ninety-four weight parts of an artificial graphite (KS-44, product of Timcal Japan Inc.) was added with 6 wt % of polyvinylidene fluoride, and the mixture was then diespersed into N-methyl-2-pyrolidone to thereby prepare a slurry, where the graphite has a "d" value (interlayer distance) for lattice plane (002) determined by X-ray diffraction analysis based on the Gakushin-Ho method of 0.336 nm; a crystallite size "$L_C$" determined by X-ray diffraction analysis based on the Gakushin-Ho method of 100 nm or larger (264 nm); an ash content of 0.04 wt %; a median diameter determined by the laser diffraction-scattering method of 17 μm; a specific surface area determined by the BET method of 8.9 m²/g; an intensity ratio "R" ($=I_B/I_A$) of 0.15, wherein "$I_A$" being an intensity of peak "$P_A$" within a wavelength range from 1580 to 1620 $cm^{-1}$ observed in argon ion laser Raman spectrometry and "$I_B$" being an intensity of peak "$P_B$" within a wavelength range from 1350 to 1370 $cm^{-1}$; and a half width of the peak "$P_A$" within a wavelength range from 1580 to 1620 $cm^{-1}$ of 22.2 $cm^{-1}$. The obtained slurry was uniformly coated on a copper foil of 18 μm thick, which is a current collector, dried, and the foil was punched into a disc of 12.5 mm diameter to produce a working electrode. The working electrode was further stacked with a separator immersed with the electrolytic solution and a lithium foil as a counter electrode in this order to thereby fabricate a coin-shaped half cell.

Comparative Example 3

A coin-shaped half cell was fabricated similarly to Example 7 except that phenylethylene carbonate was not added to the electrolytic solution.

Example 8

A coin-shaped half cell was fabricated similarly to Example 7 except that producing a working electrode using a natural graphite powder (NG-7, product of Kansai Netsukagaku K.K.) which has a "d" value (interlayer distance) for lattice plane (002) determined by X-ray diffraction analysis based on the Gakushin-Ho method of 0.336 nm; a crystallite size "$L_C$" determined by X-ray diffraction analysis based on the Gakushin-Ho method of 100 nm or larger (652 nm); an ash content of 0.07 wt %; a median diameter determined by the laser diffraction-scattering method of 12 μm; a specific surface area determined by the BET method of 7.5 m²/g; an intensity ratio "R" ($=I_B/I_A$) of 0.12, wherein "$I_A$" being an intensity of peak "$P_A$" within a wavelength range from 1580 to 1620 $cm^{-1}$ observed in argon ion laser Raman spectrometry and "$I_B$" being an intensity of peak "$P_B$" within a wavelength range from 1350 to 1370 $cm^{-1}$; and a half width of the peak "$P_A$" within a wavelength range from 1580 to 1620 $cm^{-1}$ of 19.9 $cm^{-1}$.

Comparative Example 4

A coin-shaped half cell was fabricated similarly to Example 8 except that phenylethylene carbonate was not added to the electrolytic solution.

Example 9

Two kilograms of an artificial graphite powder (KS-44, product of Timcal Japan Inc.) was mixed with 1 kg of petroleum-base pitch, and the obtained slurry-like mixture was then heated under an inert atmosphere in a batch-type furnace up to 1100° C. over 2 hours, and kept at that temperature for 2 hours. The obtained material was crushed, screened using a vibrating screen to thereby prepare powder having a grain size of 18 to 22 μm, and covered the surface of such grain with 7% of amorphous carbon to thereby obtain a "amorphous carbon coated graphitic carbonaceous material". The amorphous carbonaceous portion of such material was found to have a "d" value for lattice plane (002) determined by X-ray diffraction analysis of 0.345.

A coin-shaped half cell was fabricated similarly to Example 7 except that producing the working electrode using the foregoing "amorphous carbon coated graphitic carbonaceous material" in place of the artificial graphite powder used in Example 7.

Comparative Example 5

A coin-shaped half cell was fabricated similarly to Example 9 except that phenylethylene carbonate was not added to the electrolytic solution.

The coin-shaped half cells obtained from Examples 7 to 9 and Comparative Examples 3 to 5 were individually subjected to a charge/discharge test at 25° C. in which the cells were discharged at a constant current of 0.2 mA to a discharge termination voltage of 0 V, and charged at a constant current of 0.4 mA to a charge termination voltage of 1.5 V.

Samples obtained from Examples 7 to 9 and Comparative Examples 3 to 5 were tested for undope capacities (lithium undope capacities of the working electrode) and efficiencies (undope capacity×100/dope capacity) at the first cycle, results of which shown in Table 2.

It is to be noted that "capacity" described herein refers to a capacity per gram of a carbonaceous material used for the working electrode.

TABLE 2

|  | Undope capacity at the first cycle (mAh/g) | Efficienty at the first cycle (%) |
|---|---|---|
| Example 7 | 324 | 92.7 |
| Comparative Example 3 | — | — |
| Example 8 | 347 | 91.5 |
| Comparative Example 4 | — | — |
| Example 9 | 330 | 94.0 |
| Comparative Example 5 | — | — |

It was found that the samples of Comparative Examples 3 to 5 failed in doping lithium to reach 0 V due to serious decomposition of propylene carbonate on the surface of the carbonaceous working electrode.

On the contrary, Example 7 to 9 proved that the addition of phenylethylene carbonate to propylene carbonate was successful in suppressing the decomposition of the electrolytic solution and thus allowing the dope/undope of lithium.

INDUSTRIAL APPLICABILITY

The non-aqueous electrolytic solution secondary cell of the present invention is characterized in that achieving a minimum decomposition level of the electrolytic solution, and thus affording excellent cycle characteristics and energy density. Since the cell of the present invention has a high maintenance factor of the discharge capacity and is most promising for down-sizing and performance upgrade, the cell can widely be applicable to a variety of fields.

What is claimed is:

1. A non-aqueous electrolytic solution secondary cell comprising a negative electrode comprising a carbonaceous material capable of occluding and liberating lithium, a positive electrode, a non-aqueous electrolytic solution which comprises a solute and an organic solvent, and a separator;

wherein the organic solvent comprises at least one of compounds selected from formulae (I) and (II) below:

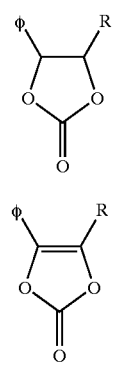

wherein $\phi$ represents a phenyl group optionally having an alkyl group; and R represents any one of a hydrogen atom, $C_{1-4}$ alkyl groups and a phenyl group optionally having an alkyl group.

2. A non-aqueous electrolytic solution secondary cell as claimed in claim 1, wherein the negative electrode further comprises a binder, and the binder comprises at least one rubber selected from the group consisting of styrene-butadiene rubber, hydrogenated styrene-butadiene rubber, styrene-isoprene rubber, hydrogenated styrene-isoprene rubber, isoprene rubber, butadiene rubber and ethylene-propylene rubber.

3. A non-aqueous electrolytic solution secondary cell as claimed in claim 1, wherein the organic solvent further comprises a cyclic carbonate or chain carbonate.

4. A non-aqueous electrolytic solution secondary cell as claimed in claim 1, wherein the solute is a lithium salt.

5. A non-aqueous electrolytic solution secondary cell as claimed in claim 4, wherein the lithium salt is at least one selected from the group consisting of $LiClO_4$, $LiPF_6$, $LiBF_4$, $LiCF_3SO_3$, $LiN(CF_3SO_2)_2$, $LiN(CF_3CF_2SO_2)_2$, $LiN(CF_3SO_2)(C_4F_9SO_2)$ and $LiC(CF_3SO_2)_3$.

6. A non-aqueous electrolytic solution secondary cell as claimed claim 1, wherein the compounds of formulae (I) and (II) comprise 0.05 to 40 wt % of the organic solvent.

7. A non-aqueous electrolytic solution secondary cell as claimed in claim 1, wherein the solute in the non-aqueous electrolytic solution has a concentration of 0.5 to 2 mol/L.

8. A non-aqueous electrolytic solution secondary cell as claimed in claim 1, wherein the carbonaceous material has a "d" value (interlayer distance) for lattice plane (002) determined by X-ray diffraction analysis based on the Gakushin-Ho method of 0.335 to 0.340 nm; an ash content of 1 wt % or less; a crystallite size "$L_c$," determined by X-ray diffraction analysis based on the Gakushin-Ho method of 30 nm or larger; a median diameter determined by the laser diffraction-scattering method of 1 to 100 μm; a specific surface area determined by the BET method of 0.5 to 25.0 $m^2$/g; an intensity ratio "R" ($=I_B/I_A$) of 0 to 0.5, wherein "$I_A$" being an intensity of peak "$P_A$" within a wavelength range from 1580 to 1620$cm^{-1}$ observed in argon ion laser Raman spectrometry and "$I_B$" being an intensity of peak "$P_B$" within a wavelength range from 1350 to 1370 $cm^{-1}$; and a half width of the peak within a wavelength range from 1580 to 1620 $cm^{-1}$ of 26 $cm^{-1}$ or less.

9. The A non-aqueous electrolytic solution secondary cell comprising:

a negative electrode comprising a carbonaceous material capable of occluding and liberating lithium, a positive electrode, a non-aqueous electrolytic solution which comprises a solute and an organic solvent, and a separator, wherein the organic solvent comprises at least one of compounds selected from formulae (I) and (II) below:

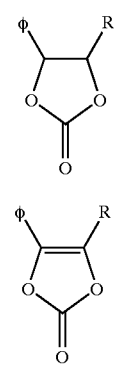

$\phi$ represents a phenyl group substituted with an alkyl group, R represents any one of a hydrogen atom, $C_{1-4}$ alkyl groups and a phenyl group optionally having an alkyl group, and the phenyl group is substituted with an alkyl group selected from the group consisting of methyl, ethyl, propyl, butyl, and hexyl.

10. A non-aqueous electrolytic solution secondary cell comprising:

a negative electrode comprising a carbonaceous material capable of occluding and liberating lithium,
a positive electrode,
a non-aqueous electrolytic solution which comprises a solute and an organic solvent, and
a separator;
wherein the organic solvent comprises at least one of compounds selected from formulae (I) and (II) below:

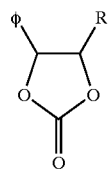

(I)

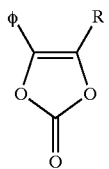

(II)

φ represents a phenyl group optionally having an alkyl group; and R is a $C_{1-4}$ alkyl group selected from the group consisting of methyl, ethyl, n-propyl, isopropyl, n-butyl, isobutyl, sec-butyl, and tert-butyl.

11. The non-aqueous electrolytic solution secondary cell of claim 1, wherein the organic solvent comprises a compound of formula (I) selected from the group consisting of phenylethylene carbonate, diphenylethylene carbonate, methylphenylethylene carbonate, and ethylphenylethylene carbonate.

12. A non-aqueous electrolytic solution secondary cell comprising:

a negative electrode comprising a carbonaceous material capable of occluding and liberating lithium, a positive electrode, a non-aqueous electrolytic solution which comprises a solute and an organic solvent, and a separator;

wherein the organic solvent comprises a compound of selected from the group consisting of phenylvinylene carbonate, diphenylvinylene carbonate, methylphenylvinylene carbonate, and ethylphenylvinylene carbonate.

13. The non-aqueous electrolytic solution secondary cell of claim 3, wherein the cyclic carbonate is at least one carbonate selected from the group consisting of ethylene carbonate, propylene carbonate, and butylene carbonate.

14. The non-aqueous electrolytic solution secondary cell of claim 3, wherein the chain carbonate is at least one carbonate selected from the group consisting of dimethyl carbonate, diethyl carbonate, and ethylmethyl carbonate.

15. The non-aqueous electrolytic solution secondary cell of claim 1, wherein the carbonaceous material is artificial or natural graphite.

16. The non-aqueous electrolytic solution secondary cell of claim 1, wherein the negative electrode further comprises a current collector which comprises a metal selected from the group consisting of copper, nickel, and stainless steel.

* * * * *